(12) United States Patent
Koizumi et al.

(10) Patent No.: US 10,295,725 B2
(45) Date of Patent: May 21, 2019

(54) LIGHT GUIDE MEMBER AND LIGHT GUIDE MEMBER MANUFACTURING METHOD

(71) Applicant: PANASONIC INTELLECTUAL PROPERTY MANAGEMENT CO., LTD., Osaka (JP)

(72) Inventors: Hideki Koizumi, Osaka (JP); Takeshi Ito, Osaka (JP); Tatsuji Ono, Osaka (JP); Yoshio Obata, Shiga (JP); Mamoru Ishizuka, Shiga (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 250 days.

(21) Appl. No.: 15/325,825

(22) PCT Filed: Jul. 21, 2015

(86) PCT No.: PCT/JP2015/003636
§ 371 (c)(1),
(2) Date: Jan. 12, 2017

(87) PCT Pub. No.: WO2016/013206
PCT Pub. Date: Jan. 28, 2016

(65) Prior Publication Data
US 2017/0205562 A1    Jul. 20, 2017

(30) Foreign Application Priority Data

Jul. 24, 2014   (JP) .................. 2014-150951

(51) Int. Cl.
*F21V 8/00* (2006.01)
*G02B 5/02* (2006.01)
(Continued)

(52) U.S. Cl.
CPC ...... *G02B 6/0055* (2013.01); *B29D 11/00663* (2013.01); *G02B 5/02* (2013.01);
(Continued)

(58) Field of Classification Search
CPC ...... G02B 6/0055; G02B 6/00; G02B 6/0038; G02B 6/0051; G02B 5/02; B29D 11/00663; B29K 2033/12
See application file for complete search history.

(56) References Cited

U.S. PATENT DOCUMENTS 6,454,452 B1 * 9/2002 Sasagawa ............ G02B 6/0061
349/65
7,458,712 B2   12/2008 Joo et al.
(Continued)

FOREIGN PATENT DOCUMENTS

JP   11-282368    10/1999
JP   2002-184228   6/2002
(Continued)

OTHER PUBLICATIONS

Official Action issued in EP Appl. No. 15 82 4110.9 dated Jun. 19, 2017.
(Continued)

*Primary Examiner* — Mary Ellen Bowman
(74) *Attorney, Agent, or Firm* — Greenblum & Bernstein, P.L.C.

(57) ABSTRACT

A light guide member includes a reflective surface with a diffusion groove array. The diffusion groove array includes diffusion grooves arranged in the reflective surface in a length direction of the light guide member. The diffusion groove array includes, as the diffusion grooves, at least two inspection grooves and a non-inspection diffusion groove. The two inspection grooves are spaced in the length direction of the light guide member. The non-inspection diffusion groove is between the two inspection grooves. An intermediate part, in a length direction, of each of the two inspection grooves is divided by an ungrooved portion with no groove.

4 Claims, 5 Drawing Sheets

(51) Int. Cl.
    *G02B 6/00*     (2006.01)
    *B29D 11/00*     (2006.01)
    *B29K 33/00*     (2006.01)

(52) U.S. Cl.
    CPC ............ *G02B 6/00* (2013.01); *G02B 6/0038* (2013.01); *G02B 6/0051* (2013.01); *B29K 2033/12* (2013.01)

(56) References Cited

U.S. PATENT DOCUMENTS

| | | | |
|---|---|---|---|
| 2002/0041500 A1* | 4/2002 | Egawa | G02B 6/0016 362/551 |
| 2003/0210539 A1 | 11/2003 | Park et al. | |
| 2006/0082884 A1* | 4/2006 | Feng | G02B 5/1814 359/569 |
| 2007/0291510 A1 | 12/2007 | Chen | |
| 2008/0013015 A1* | 1/2008 | Joo | G02B 6/0036 349/65 |
| 2009/0201696 A1* | 8/2009 | Kamikatano | G02B 6/001 362/551 |

FOREIGN PATENT DOCUMENTS

| | | |
|---|---|---|
| JP | 2006-148956 | 6/2006 |
| JP | 2007-212985 | 8/2007 |
| JP | 2008-20888 | 1/2008 |
| JP | 2010-157523 | 7/2010 |
| JP | 2014-99252 | 5/2014 |
| WO | 2014/076910 | 5/2014 |

OTHER PUBLICATIONS

International Search Report, along with English-languge translation thereof, in PCT/JP2015/003636 dated Oct. 20, 2015.

* cited by examiner

LIGHT GUIDE MEMBER AND LIGHT GUIDE MEMBER MANUFACTURING METHOD

TECHNICAL FIELD

The invention relates generally to light guide members and light guide member manufacturing methods and, more particularly, to a light guide member that is an elongated member in one direction and is configured to receive light from one end in a length direction thereof to emit the light from a surface thereof along the length direction, and a light guide member manufacturing method.

BACKGROUND ART

Document 1 (JP 2006-148956 A) discloses a bar of light guide member that is configured to be embedded in a lighting apparatus. A light scatterer configured to scatter incoming light is formed on a side-face of the light guide member. An opposite side-face of the light guide member from the light scatterer functions as a light exit surface that allows scattered light by the light scatterer to exit from.

Incidentally, the light guide member disclosed in Document 1 is screen printed with white coating for forming the light scatterer on the side-face thereof. Thus, forming coating for diffusion of light by printing causes less productivity due to the labor that requires mask for printing, and the like.

SUMMARY OF INVENTION

It is an object of the present invention to provide an excellent productivity performance light guide member and a light guide member manufacturing method.

A light guide member according to an aspect of the invention includes first and second ends, a reflective surface and a light exit surface. The first end is one end, in a length direction, of the light guide member elongated in one direction. The second end is an opposite end of the light guide member from the first end. A light entrance surface is provided on at least one of the first and second ends. The reflective surface is provided along the length direction of the light guide member and configured to reflect light from the light entrance surface. The light exit surface is provided along the length direction of the light guide member and allows the light reflected in the reflective surface to exit from. The reflective surface includes at least one diffusion groove array including diffusion grooves that are arranged in the reflective surface in the length direction of the light guide member and configured to diffuse the light from the light entrance surface. The diffusion groove array includes, as the diffusion grooves, at least two inspection grooves and a non-inspection diffusion groove. The two inspection grooves are spaced in the length direction of the light guide member. The non-inspection diffusion groove is between the two inspection grooves. An intermediate part, in a length direction, of each of the two inspection grooves is divided by an ungrooved portion with no groove.

In a light guide member manufacturing method according to an aspect of the invention, a light guide member manufactured by the method includes first and second ends, a reflective surface and a light exit surface. The first end is one end, in a length direction, of the light guide member elongated in one direction. The second end is an opposite end of the light guide member from the first end. A light entrance surface is provided on at least one of the first and second ends. The reflective surface is provided along the length direction of the light guide member and configured to reflect light from the light entrance surface. The light exit surface is provided along the length direction of the light guide member and allows the light reflected in the reflective surface to exit from. The reflective surface includes at least one diffusion groove array. The diffusion groove array includes diffusion grooves that are arranged in the reflective surface in the length direction of the light guide member and configured to diffuse the light from the light entrance surface. The diffusion groove array includes, as the diffusion grooves, at least two inspection grooves and a non-inspection diffusion groove. The two inspection grooves are spaced in the length direction of the light guide member. The non-inspection diffusion groove is between the two inspection grooves. The light guide member manufacturing method includes forming the diffusion grooves by grooving work onto the reflective surface of the light guide member, and dividing an intermediate part, in a length direction, of each of the two inspection grooves by an ungrooved portion to which the grooving work is not applied, thereby forming the two inspection grooves.

DESCRIPTION OF EMBODIMENTS

Figure 1:
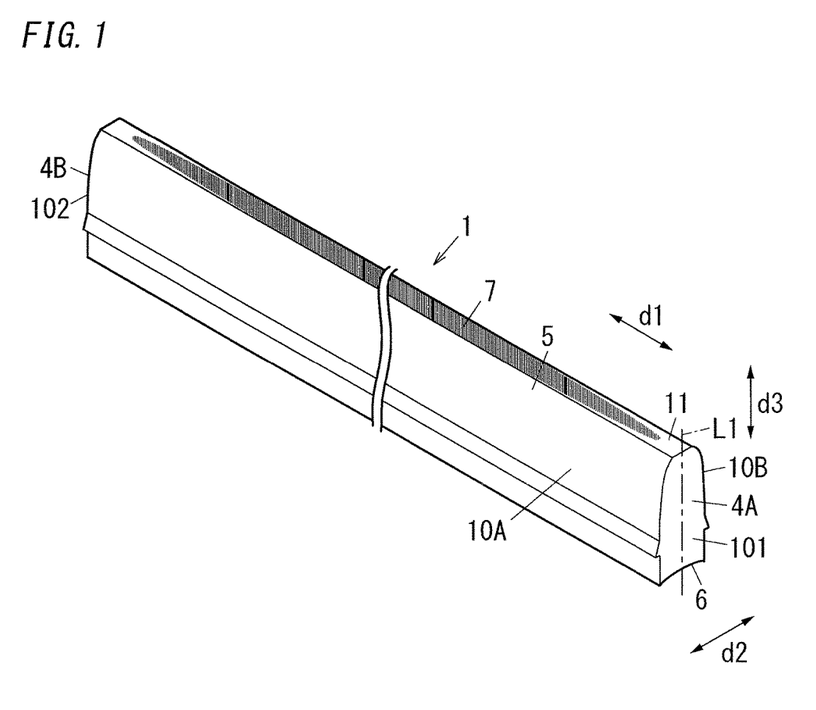
FIG. 1 is a perspective view of a light guide member in accordance with an embodiment.
Figure 2:
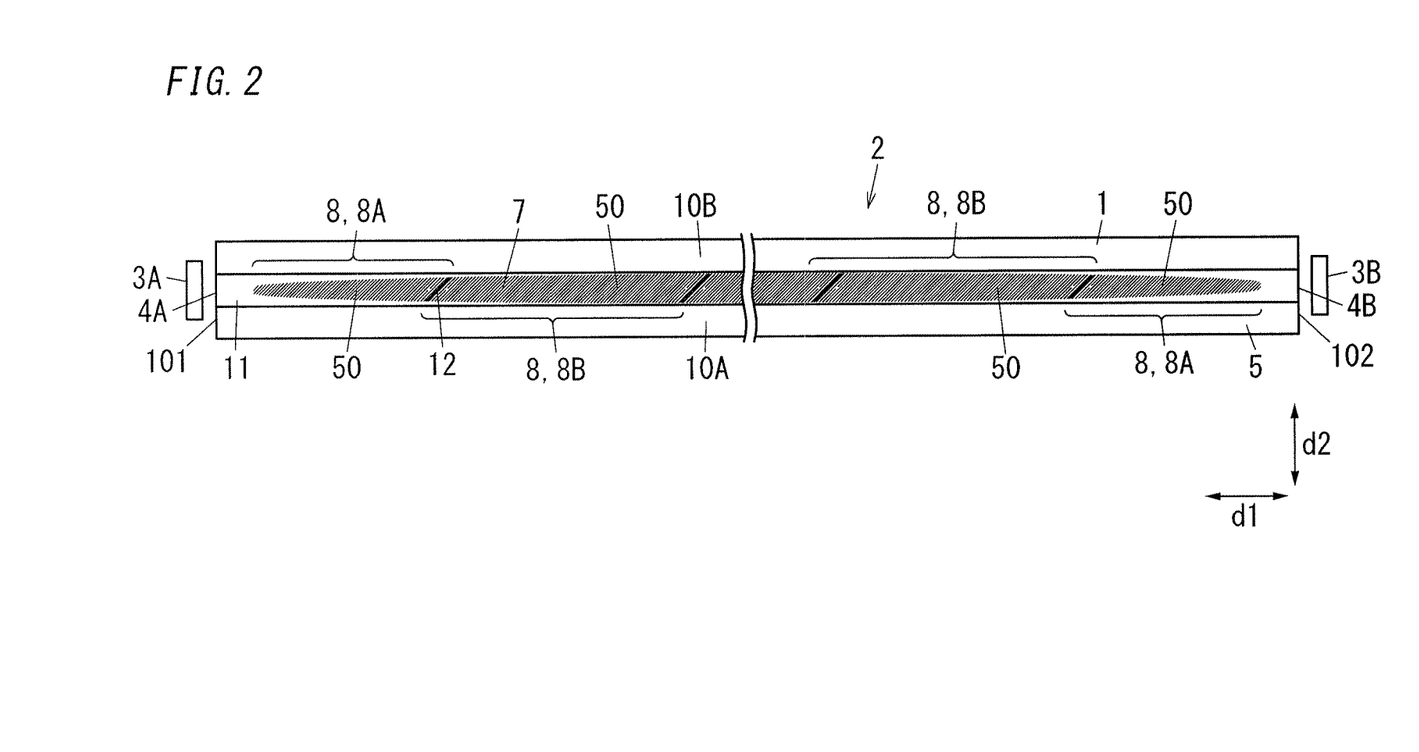
FIG. 2 is a top view of two light sources and the light guide member of a lighting apparatus in the embodiment.

Embodiments will be hereinafter explained in detail with reference to accompanying drawing. FIG. 1 is a perspective view of a light guide member 1 in accordance with a present embodiment. For example, the light guide member 1 may be embedded in a lighting apparatus. FIG. 2 is a top view of two light sources 3A and 3B and the light guide member 1 embedded in a lighting apparatus 2 in the embodiment.

Examples of an installation object in which the lighting apparatus 2 is provided include: a ceiling, a wall and a floor of a room; a cabinet; a panel; and the like. The lighting apparatus 2 includes the light guide member 1 and the two light sources 3A and 3B. The light guide member 1 may be elongated in one direction. For example, the light guide member 1 may be an elongated member.

A method for lighting the lighting apparatus 2 may be an edge lighting method. For example, the lighting apparatus 2 is configured to introduce light into the light guide member 1 from one end, in a length direction d1, of the light guide member 1 to exit the introduced light from a surface thereof along the length direction d1. In the present embodiment, the lighting apparatus 2 is configured to introduce the light into the light guide member 1 from both ends in the length direction d1 of the light guide member 1, but another example thereof may be configured to introduce the light into the light guide member 1 from only one end in the length direction d1 of the light guide member 1.

As shown in FIG. 1, the light guide member 1 of the embodiment is a straight bar of member that is elongated in one direction. The light guide member 1 includes a first end 101 that is one end in the length direction d1 of the light guide member 1 and a second end 102 that is an opposite end of the light guide member 1 from the first end 101.

In the explanation below, a height direction d3 is a direction that is perpendicular to the length direction d1 of the light guide member 1 and parallel to a light emitting direction from the light guide member 1. In addition, a width direction d2 is a direction that is perpendicular to both of the length direction d1 and the height direction d3 of the light guide member 1.

The light guide member 1 may be made from synthetic resin. The light guide member 1 of the embodiment is manufactured by the extrusion of synthetic resin material with translucency (optical transparency). Examples of the synthetic resin material include, but not limited to, PMMA (poly methyl methacrylate), and PMMA to which either or both of PMA (polymethyl acrylate) and acrylic rubber are added. The examples of the light guide member 1 may further include other material with translucency such as glass.

The light guide member 1 may have a substantially uniform section in form along the length direction d1 of the light guide member 1, where the section is perpendicular to the length direction d1 of the light guide member 1. The form of the section perpendicular to the length direction d1 of the light guide member 1 may be elongated in the height direction d3 of the light guide member 1. For example, the section perpendicular to the length direction d1 of the light guide member 1 may be elongated in the height direction d3. The form of the section perpendicular to the length direction d1 of the light guide member 1 may have line symmetry, a line of which is a central line L1 going through a center in the width direction d2 of the light guide member 1.

The light guide member 1 further includes two light entrance surfaces 4A and 4B, a reflective surface(s) 5, and a light exit surface 6. Hereinafter, one of the light entrance surfaces 4A and 4B is called a first light entrance surface 4A, while the other is called a second light entrance surface 4B.

The first light entrance surface 4A may be provided on the first end 101 of the light guide member 1. In the embodiment, the first light entrance surface 4A is an end face, at a side of the first end 101 in the length direction d1, of the light guide member 1. For example, the first light entrance surface 4A is one end face in the length direction d1 of the light guide member 1.

The second light entrance surface 4B may be provided on the second end 102 of the light guide member 1. In the embodiment, the second light entrance surface 4B is an end face, at a side of the second end 102 in the length direction d1, of the light guide member 1. For example, the second light entrance surface 4B is an opposite end face of the light guide member 1 from the first light entrance surface 4A.

For example, in the light guide member 1 of the embodiment, the light entrance surfaces 4A and 4B are provided on both ends (the first and second ends 101 and 102) in the length direction 1d of the light guide member 1, respectively. Note that a light entrance surface may be provided on only one end in the length direction 1d of the light guide member 1. Desirably, the light guide member 1 has at least one light entrance surface provided on at least one of the first and second ends 101 and 102.

The first and second light entrance surfaces 4A and 4B are perpendicular to the length direction d1 of the light guide member 1. For example, the first and second light entrance surfaces 4A and 4B may be smooth surfaces formed by laser cut-off.

The reflective surfaces 5 and the light exit surface 6 may be surfaces along the length direction d1 of the light guide member 1. The light exit surface 6 of the embodiment is one of both surfaces, at both sides of the height direction d3, of the light guide member 1. In the embodiment, the reflective surfaces 5 are part of peripheral surfaces of the light guide member 1 except for the light exit surface 6 of the peripheral surfaces of the light guide member 1.

Hereinafter, in side surfaces 10A and 10B, at both sides in the width direction d2, of the light guide member 1, one side surface 10A is called a first side surface and the other side surface 10B is called a second side surface 10B, as needed. An opposite side surface of the light guide member 1 from the light exit surface 6 in the height direction d3 is called a side surface 11 as needed.

The reflective surfaces 5 may be configured to reflect light introduced into the light guide member 1 from the first and second light entrance surfaces 4A and 4B. In the present embodiment, the reflective surfaces 5 are composed of the side surface 11, and the first and second side surfaces 10A and 10B. The side surface 11, and the first and second side surfaces 10A and 10B are formed along the whole of the length direction d1 of the light guide member 1.

The side surface 11 is, for example perpendicular to the height direction d3 of the light guide member 1. A width of the side surface 11 (dimension in the width direction d2 of the light guide member 1) is desirably smaller than a width of the light exit surface 6 (dimension in the width direction d2 of the light guide member 1).

The side surface 11 includes at least a diffusion groove array 50 as shown in FIG. 2. In the embodiment, the side surface 11 includes diffusion groove arrays 50. Note that the diffusion groove arrays 50 of the embodiment are formed in the side surface 11, but may be formed in the side surface 11 and the first and second side surfaces 10A and 10B. Alternatively, the diffusion groove arrays 50 may be formed in only the first and second side surfaces 10A and 10B, or only in either the first side surface 10A or the second side surface 10B.

Each of the diffusion groove arrays 50 includes, e.g. a plurality of (multiple) diffusion grooves 7 provided in the side surface 11 and arranged in the length direction d1 of the light guide member 1.

In the embodiment, each individual diffusion groove array 50 has diffusion grooves 7 arranged at equal intervals in the length direction d1 of the light guide member 1. In the embodiment, each diffusion groove array 50 has diffusion grooves 7 arranged at equal intervals which are the same among all the diffusion groove arrays 50. Note that each diffusion groove array 50 may have diffusion grooves 7 arranged at equal intervals which are the same among all the diffusion grooves 7 in the light guide member 1, but may have diffusion grooves 7 arranged at different intervals every diffusion groove array 50.

Each diffusion groove 7 may be configured to diffuse light entering the light guide member 1 from the first and second light entrance surfaces 4A and 4B.

In the embodiment, the diffusion groove arrays 50 are formed in the side surface 11 except for both ends thereof in the length direction.

The diffusion grooves 7 may be elongated in a direction intersecting with the length direction d1 of the light guide member 1. In the embodiment, respective length directions of the diffusion grooves 7 are parallel to each other. In the embodiment, each diffusion groove 7 is inclined so that part thereof near to the first light entrance surface 4A is in a side of the first side surface 10A as seen from the height direction d3 of the light guide member 1. Note that a length direction of each diffusion groove 7 may be parallel to the width direction d2 of the light guide member 1 as seen from the height direction d3 of the light guide member 1.

When light entering the light guide member 1 from the first and second light entrance surfaces 4A and 4B strikes any part of the diffusion grooves 7, the light is diffused and then reflects towards the light exit surface 6 and the side surfaces 10A and 10B. Light reflected in the side surface 11 (with the diffusion grooves 7) to reach the side surfaces 10A and 10B of the light guide member 1 includes components to be reflected towards the light exit surface 6. Therefore, the components of the light entering the light guide member 1 from the first and second light entrance surfaces 4A and 4B are reflected in the reflective surfaces 5 to reach the light exit surface 6 and then emitted from the light exit surface 6.

All the diffusion grooves 7 formed in the side surface 11 may include diffusion grooves 7, in an intermediate part in the length direction of the side surface 11, which straddle between both ends in the width direction of the side surface 11. They may also include diffusion grooves 7, in both sides of the intermediate part in the length direction d1 of the side surface 11, which are formed in only an intermediate part in the width direction of the side surface 11 but not formed in both ends in the width direction of the side surface 11. In this case, respective lengths of the diffusion grooves 7 in both the sides in the length direction of the side surface 11 are shorter than respective lengths of the diffusion grooves 7 in the intermediate part in the length direction of the side surface 11. The diffusion grooves 7 in both the sides in the length direction of the side surface 11 may have centers in their respective length directions, which accord with a center in the width direction of the side surface 11.

Light entering the light guide member 1 from the first and second light entrance surfaces 4A and 4B is hard to reach the intermediate part in the length direction d1 of the light guide member 1. However, in the present embodiment as stated above, the respective lengths of the diffusion grooves 7 in the intermediate part in the length direction of the side surface 11 are longer than the respective lengths of the diffusion grooves 7 in both the sides in the length direction of the side surface 11. Accordingly, the intermediate part in the length direction of the side surface 11 is easy to reflect the light towards the light exit surface 6. It is consequently possible to exit a uniform amount of light from the light exit surface 6 of the light guide member 1 throughout the length direction of the light exit surface 6.

The respective lengths of the diffusion grooves 7 in both the sides in the length direction of the side surface 11 become gradually longer towards the intermediate part in the length direction of the side surface 11. It is accordingly possible to emit a further uniform amount of light from the light exit surface 6.

Each diffusion groove 7 may be formed in the side surface 11 by grooving (work). In the embodiment, each diffusion groove 7 is formed by cutting (work) by laser radiation onto the flat side surface 11 from the outside.

As shown in FIG. 2, the side surface 11 has a plurality of (multiple) groove formation regions 8 arranged in the length direction d1 of the light guide member 1. Each groove formation region 8 may be an elongated region in the length direction d1 of the light guide member 1.

Each of the groove formation regions 8 may be formed with a diffusion groove array 50. Each diffusion groove array 50 may have diffusion grooves 7 formed in a whole range in the length direction of a corresponding groove formation region 8.

Each diffusion groove array 50 may have diffusion grooves 7 formed by scanning and radiating laser over a corresponding groove formation region 8 based on a prepared pattern in advance. Specifically, in the manufacture of light guide members 1, laser is scanned based on a prepared pattern every diffusion groove array 50 (groove formation region 8), and each groove formation region 8 is formed with diffusion grooves 7 by the laser.

Note that in the embodiment, multiple diffusion grooves 7 are formed in the light guide member 1 by scanning laser based on the prepared patterns, but all the diffusion grooves 7 may be formed in the light guide member 1 by scanning laser based on one prepared pattern. The grooving work for forming the diffusion grooves 7 may be grooving work by using a slitting tool, or another work other than laser radiation.

Incidentally, spacing adjoining groove formation regions 8 in the length direction d1 of the light guide member 1 may cause difficulty in uniformly emitting light from the light exit surface 6 because no diffusion groove 7 is formed between the adjoining groove formation regions 8. If the interval between the adjoining diffusion groove arrays 50 is large due to manufacturing error in particular, the light guide member 1 may be partially dark because a decreased amount of light is to exit from a part of the light exit surface 6 corresponding to a part between the adjoining diffusion groove arrays 50, as seen from the height direction d3.

In the embodiment, the light guide member 1 is therefore formed by groove formation regions 8 in which each adjoining groove formation regions 8 in the length direction d1 of the light guide member 1 have a common part therebetween. Specifically, the groove formation regions 8 of the embodiment include, as the groove formation regions 8, first groove formation regions 81 and second groove formation regions 82. The embodiment includes a second groove formation region 82 between a first groove formation region 81 and the second end 102. The first groove formation regions 81 and second groove formation regions 82 are arranged so that each adjoining first and second groove formation regions 8 in the length direction d1 of the light guide member 1 have a common part formed by their respective ends.

Thus, since each adjoining first and second groove formation regions 8 have a common part formed by their respective ends, it is possible to form the multiple diffusion grooves 7 over the whole range to be formed with the diffusion grooves 7 in the light guide member 1 (an area between both the ends in the length direction d1 of the light guide member 1). For example, there is a possibility that no diffusion groove 7 may not be formed between adjoining diffusion groove arrays 50 in the reflective surfaces 5 as a result of a corresponding second diffusion groove array 502 being out of place on a side of the second end 102 owing to manufacturing error of the light guide member 1. On the other hand, since the light guide member 1 of the embodiment is formed by the groove formation regions 8 in which each adjoining groove formation regions 8 in the length direction d1 of the light guide member 1 have a common part, the light guide member 1 is hard to be dark partially.

Hereinafter, a common part of each adjoining groove formation regions 8 in the length direction d1 of the light guide member 1 (i.e., each first groove formation region's 81 part shared with a corresponding second groove formation region 82) is called a "common part 12".

Figure 3:
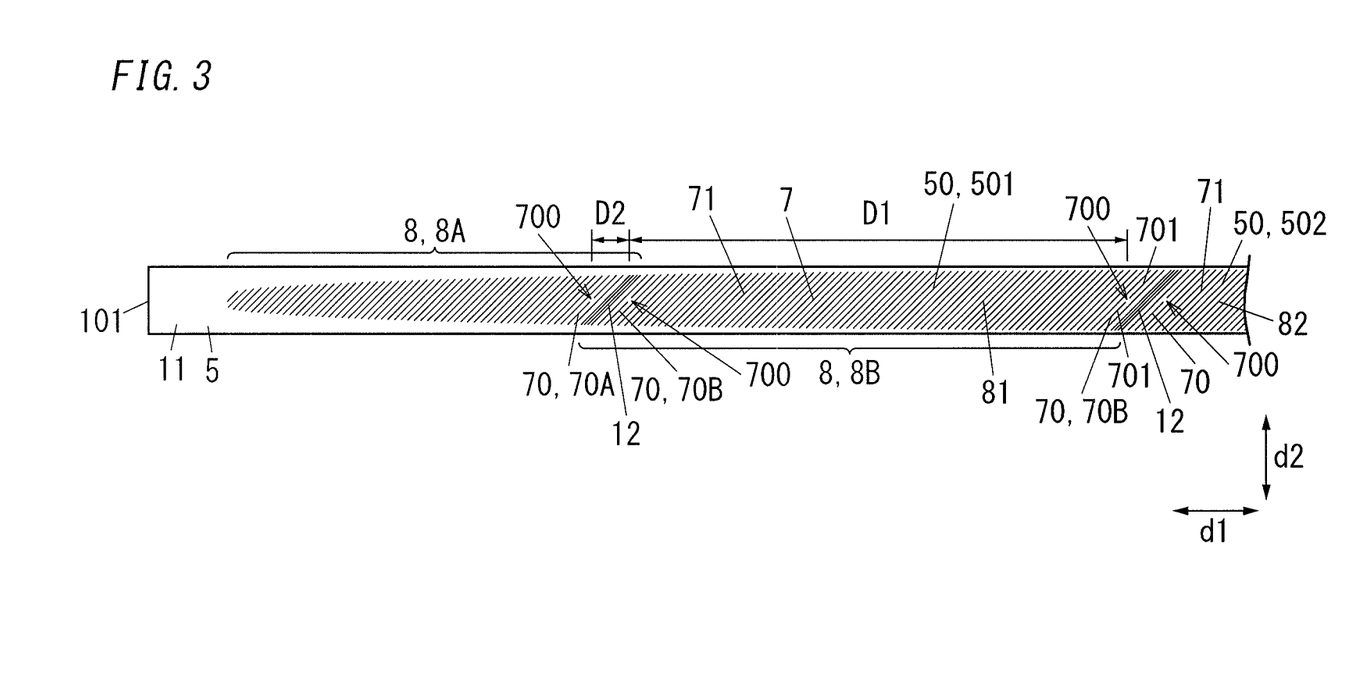
FIG. 3 is an enlarged view of an end face side of the light guide member in the embodiment.

As shown in FIG. 3, each of the diffusion groove arrays 50 may include, as diffusion grooves 7, one or more inspection grooves 70 and at least one non-inspection diffusion groove 71 different from the one or more inspection grooves 70.

For example, diffusion grooves 7 in each of the diffusion groove arrays 50 include a prescribed diffusion groove(s) 7 as the one or more inspection grooves 70 different from the non-inspection diffusion groove(s) 71. The inspection grooves 70 enable an inspector to inspect whether or not multiple diffusion grooves 7 are correctly formed in a determined range(s) of the side surface 11 (for example, whether or not the number of the diffusion grooves 7 is correct, or whether or not respective intervals of the diffusion grooves 7 are correct).

Each groove formation region 8 may be provided with one inspection groove 70 or two inspection grooves 70. That is, each diffusion groove array 50 may include one or two inspection grooves 70.

For example, all the groove formation regions 8 include groove formation end regions 8A that are two groove formation regions 8 on both (outermost) ends in the length direction d1 of the light guide member 1, and groove formation intermediate regions 8B that are remaining groove formation regions 8 (groove formation regions 8 between the groove formation end regions 8A). Each groove formation end region 8A may be provided with one inspection groove 70, and each groove formation intermediate region 8B may be provided with two inspection grooves 70. Hereinafter, respective inspection grooves 70 of the groove formation end regions 8A are called first inspection grooves 70A, and respective inspection grooves 70 of the groove formation intermediate regions 8B are called second inspection grooves 70B.

Each groove formation end region 8 is formed with an inspection groove 70 of all the inspection grooves 70, which is on one end in the length direction d1 of the light guide member 1 (on the outermost side). Each first inspection groove 70A of the groove formation end regions 8A is provided at an end of a corresponding groove formation end region 8A, which is on a side of the center in the length direction 1d of the light guide member 1 (on a side of a neighboring groove formation intermediate region 8B).

Each groove formation end region 8A may be provided with: non-inspection diffusion grooves 71 disposed on the outside in the length direction d1 of the light guide member 1, as seen from a corresponding first inspection groove 70A; and non-inspection diffusion grooves 71 disposed on a center side in the length direction d1 of the light guide member 1, as seen from the corresponding first inspection groove 70A.

Both ends in the length direction of each groove formation intermediate region 8B may be provided with second inspection grooves 70B. In this case, each groove formation intermediate region 8B may be provided with two second inspection grooves 70B.

Each groove formation intermediate region 8B may be also provided with non-inspection diffusion grooves 71 between its own two second inspection grooves 70B. Each groove formation intermediate region 8B may further include non-inspection diffusion grooves 71 that are disposed outside each of its own two second inspection grooves 70B in the length direction d1 of the light guide member 1. In this case, non-inspection diffusion grooves 71 are provided between an inspection groove 70 in one of adjoining groove formation regions 8 on a side of the other, and an inspection groove 70 in the latter on a side of the former.

There is no limitation on the number of diffusion grooves 7 formed in each groove formation region 8. Each groove formation end region 8A may be formed with at least one first inspection groove 70A and a non-inspection diffusion groove(s) 71. That is, each groove formation region 8 may be formed with two or more diffusion grooves 7.

In addition, each groove formation intermediate region 8B may be formed with at least two second inspection grooves 70B and a non-inspection diffusion groove(s) 71 between the two second inspection grooves 70B. In short, each groove formation intermediate region 8B may be formed with three or more diffusion grooves 7.

A diffusion groove 7 (non-inspection diffusion groove 71), nearest to the second end 102, of the diffusion grooves 7 in a first diffusion groove array 501 may be nearer to the second end 102 than a diffusion groove 7 (non-inspection diffusion groove 71), nearest to the first end 101, of the diffusion grooves 7 in the second diffusion groove array 502.

A second inspection groove 70B, nearer to the second end 102, of the two second inspection grooves 70B in the first diffusion groove array 501 may be nearer to the first end 101 than a diffusion groove 7 (non-inspection diffusion groove 71), nearest to the first end 101, in the second diffusion groove array 502. A second inspection groove 70B, nearer to the first end 101, of the two second inspection grooves 70B in the second diffusion groove array 502 may be nearer to the second end 102 than a diffusion groove (non-inspection diffusion groove 71), nearest to the second end 102, in the first diffusion groove array 501. For example, inspection grooves 70 may not be provided in a common part 12 of adjoining groove formation regions 8, but formed in a region except for each common part 12 of the groove formation regions 8.

If the light guide member 1 is formed with the inspection grooves 70 in accordance with design, it is to have intervals D1, each of which is an interval of two second inspection grooves 70B spaced in the length direction d1 of the light guide member 1 within a corresponding groove formation intermediate region 8B and has the same prescribed dimension among all the groove formation intermediate regions 8B. Hereinafter, this prescribed dimension as a design value is called a first prescribed dimension.

If the light guide member 1 is formed with inspection grooves 70 in accordance with design, it is to have intervals D2, each of which is an interval of corresponding adjoining inspection grooves 70 spaced via a corresponding common part 12 in the length direction d1 of the light guide member 1 and has a prescribed dimension shorter than the first prescribed dimension. Hereinafter, this prescribed dimension as a design value is called a second prescribed dimension.

In the embodiment, the light guide member 1 is provided with the first inspection grooves 70A and the second inspection grooves 70B, but the first inspection grooves 70A may be omitted. In the embodiment, each groove formation intermediate region 8B is provided with two second inspection grooves 70B, but the light guide member 1 may be provided with only two second inspection grooves 70B as a whole. The embodiment is not limited by the number of diffusion grooves 7 formed in the light guide member 1, but it is desirable that the light guide member 1 include, at least, two second inspection grooves 70B and a non-inspection diffusion groove 71 between the two second inspection grooves 70B.

Desirably, each inspection groove 70 is divided by an ungrooved portion 700 that is at an intermittent part thereof in the length direction and has no groove. In other words, each inspection groove 70 may be composed of an ungrooved portion 700 and two grooves 701 divided by the ungrooved portion 700. Each ungrooved portion 700 of the inspection grooves 70 may be flat and continuously flush with part of the reflective surface 5 with no diffusion groove 7.

Each ungrooved portion 700 of the inspection grooves 70 (interval between two grooves 701 spaced via the ungrooved portion 700) may have a visible size or dimension. For example, the interval between two grooves 701 spaced via the ungrooved portion 700 is about 0.5 mm. Therefore, an inspector who inspects manufactured light guide members 1 can easily recognize diffusion grooves 7 with their respective ungrooved portions 700 as inspection grooves 70 by performing the visual inspection of the ungrooved portions 700.

Each ungrooved portion 700 of the inspection grooves 70 may be formed by temporarily stopping or decreasing laser output while a corresponding diffusion groove 7 is formed by grooving work using laser radiation. Respective ungrooved portions 700 of the inspection grooves 70 may be disposed at the same position in a width direction of the light guide member 1. The ungrooved portions 700 may be disposed at the center of a width direction of the side surface 11 and arranged in the length direction d1 of the light guide member 1.

The ungrooved portions 700 in the side surface 11 are available for simple inspection for judging whether or not each groove formation region 8 is correctly formed with diffusion grooves 7.

For example, an inspector can generally check whether or not diffusion grooves 7 are formed in a whole area to be formed with the diffusion grooves 7 by confirming ungrooved portions 700 formed in a voluntary groove formation region 8 or by counting the total number of ungrooved portions 700 in each light guide member 1.

An inspector can also generally check whether or not each groove formation intermediate region 8B is correctly formed with diffusion grooves 7, by measuring the interval D1 of the two second inspection grooves 70B in a corresponding groove formation intermediate region 8B (interval of two ungrooved portions 700) to compare the measured value (actual size value) with the first prescribed value as a design value.

An inspector can also generally check whether or not a common part 12 of each adjoining groove formation regions 8 has a dimension in the length direction d1 within a prescribed dimension range, by measuring the interval D2 between corresponding adjoining inspection grooves 70 via a corresponding common part 12 (interval between two ungrooved portions 700) to compare the measured value (actual size value) with the second prescribed value as a design value.

In FIG. 2, the lighting apparatus 2 is provided with the two light sources 3A and 3B, in which the light source 3A is at one end side in the length direction dl of the light guide member 1 (at a side of the first end 101) and faces the first light entrance surface 4A while the light source 3B is at another end side in the length direction dl of the light guide member 1 (at a side of the second end 102) and faces the second light entrance surface 4B.

When the light sources 3A and 3B of the lighting apparatus 2 emit respective light, the light from the (first) light source 3A enters the light guide member 1 from the first light entrance surface 4A while the light from the (second) light source 3B enters the light guide member 1 from the second light entrance surface 4B. Thus, respective light entering the light guide member 1 from the light entrance surfaces. 4A and 4B is transmitted towards respective opposite end faces in the length direction d1 of the light guide member 1 while being reflected in the reflective surfaces 5. Light transmitted within the light guide member 1 strikes multiple diffusion grooves 7 to diffuse and reflect, thereby exiting from the light exit surface 6. Accordingly, linear light is emitted substantially from the whole light exit surface 6.

Figure 4:
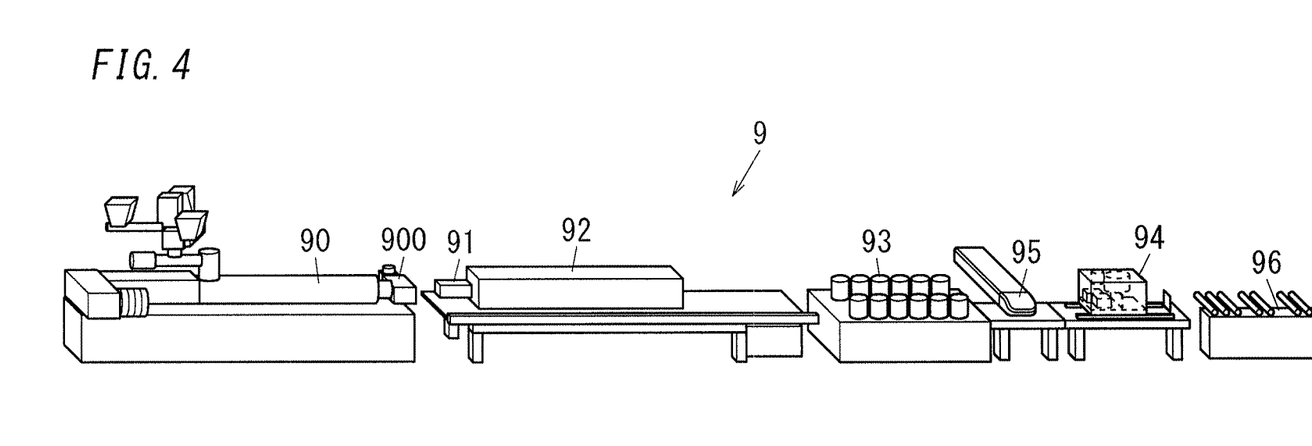
FIG. 4 is a perspective view of a manufacturing system in the embodiment.

Manufacturing equipment 9 for the light guide members 1 is now explained. FIG.4 shows the manufacturing equipment 9 for the light guide members 1 (production line).

The manufacturing equipment 9 may include an extrusion machine 90, a sizing system 91, a (water) tank 92, a pull machine 93, a laser beam machine 95, a cutter 94 and an alignment machine 96.

Figure 5:
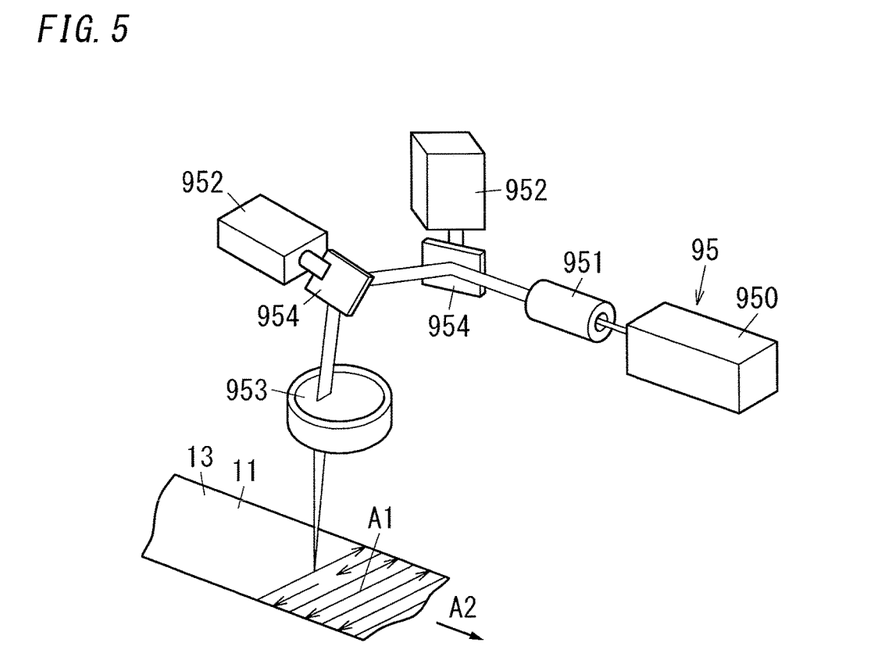
FIG. 5 is a perspective view illustrating processes for forming diffusion grooves of the light guide member in the embodiment.

The sizing system 91, tank 92, pull machine 93, laser beam machine 95, cutter 94 and alignment machine 96 may be arranged in this order in a pultrusion direction of extrudate 13 to be extruded from the extrusion machine 90 (FIG. 5). In this case, the extrusion machine 90, sizing system 91, tank 92, pull machine 93, laser beam machine 95, cutter 94 and alignment machine 93 are provided in this order from the upstream side of the production line.

An extrusion mold 900 may be provided at a tip of the extrusion machine 90.

In the embodiment, the laser beam machine 95 is based on a laser method such as a galvano-scanning method. In FIG. 5, the laser beam machine 95 includes a laser oscillator 950, a beam expander 951, galvanoscanners 952 and an fθ lens 953. Examples of the laser beam machine 95 include a carbon dioxide laser of about 30 W and the like.

In FIG. 4, the cutter 94 is configured to cut off the extrudate 13 by laser radiation from a carbon dioxide laser (a $CO_2$ laser), an output of which is, for example 100 W.

In the embodiment, a light guide member manufacturing method may include an extrusion process, a sizing process, a cooling process, a pull process, a cutting process, a cut-off process and an alignment process.

The extrusion process may include forming the extrudate 13 by extrusion through the extrusion machine 90 (see FIG. 5). In this extrusion, the extrusion machine 90 hardens synthetic resin material to be light guide members 1 and then extrudes the hardened one through the extrusion mold 900. Note that the extrusion process in this example does not include a process (i.e., cut-off process) for cutting off the extrudate 13 continuously extruded from the extrusion machine 90 to obtain light guide members 1 with a desired length.

The pull process may include pulling, through the pull machine 93, the extrudate 13 extruded through the extrusion mold 900. In this case, the extrudate 13 is to pass through the sizing system 91, tank 92, pull machine 93 and laser beam machine 95 in this order. Specifically, the extrusion process, sizing process, cooling process and cutting process are performed with respect to the extrudate 13 through the extrusion machine 90, sizing system 91, tank 92 and laser beam machine 95 in this order, respectively. The extrudate 13 is subsequently cut off by the cut-off process.

The sizing process may include forming the extrudate 13 passing through the sizing system 91 into a predetermined shape through the sizing system 91. In this case, the extrudate 13 passing through the sizing system 91 is to have a cross-sectional shape that is substantially the same as those of manufactured light guide members 1.

The cooling process may include allowing the extrudate 13 to pass through the tank 92. In this case, the extrudate 13 is cooled by the water in the tank 92 to be hardened.

The cutting process (diffusion part formation process) may include laser radiation from the laser beam machine 95 onto the extrudate 13 to be moved in a pultrusion direction by the pull machine 93. In this case, each part to be formed as side surfaces 11 in the extrudate 13 is to be formed with multiple diffusion grooves 7 by the laser radiation from the laser beam machine 95.

In the present embodiment, the cutting process is performed sequentially along with the extrusion process (and both are processes of an in-line system). In this cutting process, the extrudate 13 continuously extruded from the extrusion machine 90 (the extrudate 13 before it is cut off every desired length) is formed with diffusion grooves 7.

In the cutting process, a mirror 954 of the galvanoscanners 952 in the laser beam machine 95 (see FIG. 5) is driven based on prepared patterns that are individually set for the groove formation regions 8. In this case, a laser beam from the laser beam machine 95 is scanned to strike each side surface 11. The laser radiation point is to move on each part to be formed as side surfaces 11 in the extrudate 13 in a direction intersecting with the pultrusion direction. In FIG. 5, each arrow A1 depicts a radiation area and a scanning direction of a laser beam, and the arrow A2 depicts a moving direction (the pultrusion direction) of the extrudate 13.

Each side surface 11 in the extrudate 13 includes multiple groove formation regions 8, arranged in the pultrusion direction, each of which is formed with multiple diffusion grooves 7 arranged in the pultrusion direction by the laser radiation.

In FIG. 3, each adjoining groove formation regions 8 has a common part on both ends thereof in the length direction d1 of the light guide member 1. Accordingly, the common part 12 is provided with, as double grooving work, grooving work for forming diffusion grooves in one of the groove formation regions 8 and grooving work for forming diffusion grooves in another of the groove formation regions 8. In this case, the common part 12 is formed with diffusion grooves 7 in one of the adjoining groove formation regions 8 and diffusion grooves 7 in another of the adjoining groove formation regions 8, thereby densely having diffusion grooves 7 in comparison with diffusion grooves 7 in other parts except for the common part 12. Diffusion grooves 7 may be also formed in the common part. 12 with diffusion grooves 7 in one of the adjoining groove formation regions 8 overlapping with diffusion grooves 7 in another of the adjoining groove formation regions 8, thereby becoming deeper grooves or wider grooves.

Each inspection groove 70 in the groove formation regions 8 is formed by temporarily stopping or decreasing laser output while a corresponding groove is formed by laser radiation like non-inspection diffusion grooves 71 in grooving work (see FIG. 5).

As shown in FIG. 4, the cut-off process may include cutting off the extrudate 13, to be moved in the pultrusion direction through the pull machine 93, by the laser radiation from the cutter 94. In the embodiment, the cut-off process is performed sequentially along with the extrusion process (and both are processes of the in-line system). In the cut-off process, the extrudate 13 continuously extruded from the extrusion machine 90 (the extrudate 13 before it is cut off every desired length) is cut off with the cutter 94.

Specifically, the cutter 94 may aim a laser beam of the carbon dioxide laser onto the extrudate 13 passing through the cutter 94 in a direction perpendicular to the length direction, thereby cutting off the extrudate 13 in the direction perpendicular to the length direction. It is accordingly cut off into light guide members 1 with a desired length. Each of the light guide members 1 has end faces (light entrance surfaces 4A and 4B) in the length direction d1, each of which is a flat face as a whole by thermal cutting by the laser beam from the cutter 94.

The alignment process may include sequentially arranging the cut off light guide members 1 through the alignment machine 96.

The light guide member 1 of the embodiment described above has a first feature below. The light guide member 1 is elongated in one direction. The light guide member 1 includes: the first end 101 that is one end, in the length direction dl, of the light guide member 1; and the second end 102 that is an opposite end of the light guide member 1 from the first end 101. The light guide member 1 further includes a light entrance surface 4A or 4B that is provided on at least one of the first and second ends 101 and 102. The light guide member 1 further includes the reflective surface 5 and the light exit surface 6. The reflective surface 5 is provided along the length direction dl of the light guide member 1, and configured to reflect light from the light entrance surface 4A or 4B. The light exit surface 6 is provided along the length direction dl of the light guide member 1, and allows the light reflected in the reflective surface 5 to exit from. The reflective surface 5 includes at least one diffusion groove array 50. The diffusion groove array 50 includes diffusion grooves 7 that are arranged in the reflective surface 5 in the length direction dl of the light guide member 1. Each of the diffusion grooves 7 is configured to diffuse the light from the light entrance surface 4A or 4B. The diffusion groove array 50 includes, as the diffusion grooves 7, at least two inspection grooves 70B and a non-inspection diffusion groove 71. The two inspection grooves 70B are spaced in the length direction dl of the light guide member 1. The non-inspection diffusion groove 71 is between the two inspection grooves 70B. The two inspection grooves 70B are divided by their respective intermediate parts in the length direction, which are the ungrooved portions 700 with no groove.

In an example, the light guide member 1 may be elongated in one direction. The light guide member 1 may include the light entrance surface 4A, the reflective surface 5 and the light exit surface 6. The light entrance surface 4A may be an end, in the length direction d1, of the light guide member 1. The reflective surface 5 may be provided along the length direction d1 of the light guide member 1, and configured to reflect the light from the light entrance surface 4A. The light exit surface 6 may be provided along the length direction d1 of the light guide member 1, and allows the light reflected in the reflective surface 5 to exit from. The reflective surface 5 may be provided with grooves, and the light guide member 1 is thereby provided in the reflective surface 5 with multiple diffusion grooves 7, for diffusing light from the light entrance surface 4A, in the length direction d1 of the light guide member 1. The multiple diffusion grooves 7 may include at least two inspection grooves 70. The two inspection grooves 70 may be disposed a prescribed dimension (the first prescribed dimension) apart in the length direction d1 of the light guide member 1 with multiple diffusion grooves 7 (non-inspection diffusion grooves 71 different from the inspection grooves 70) existing between both the grooves. In the reflective surfaces 5, respective intermediate parts, in the length direction, of the two inspection grooves 70 are the ungrooved portions 700 with no groove.

With the light guide member 1 having the first feature, the reflective surface 5 can be easily formed with light diffusion part (diffusion grooves 7) by only grooving work. It is accordingly possible to increase productivity of light guide members 1 in comparison with the case where such light diffusion part is formed by, for example printing because a mask for the printing is unnecessary. In addition, an inspector can generally check whether or not diffusion grooves 7 are correctly formed by, for example measuring the interval D1 between the two inspection grooves 70B. Each of the two inspection grooves 70B can be easily provided with an ungrooved portion 700 as a marker only by not applying grooving work to an intermediate part, in the length direction, of a corresponding inspection groove 70.

Preferably, the light guide member 1 having the first feature has a second feature like the above embodiment, in which the reflective surface 5 includes, as at least one diffusion groove array 50, diffusion groove arrays 50 arranged in the length direction d1 of the light guide member 1. Each of the diffusion groove arrays 50 may include diffusion grooves 7.

In this case, the reflective surface 5 includes the groove formation regions 8B arranged in the length direction d1 of the light guide member 1. Each of the groove formation regions 8B is provided with multiple diffusion grooves 7 in the length direction d1 of the light guide member 1.

With the light guide member 1 having the second feature, an inspector can generally check whether or not each diffusion groove array 50 is correctly formed with diffusion grooves 7, by measuring an interval D1 of two inspection grooves 70B in each diffusion groove array 50.

Preferably, the light guide member 1 having the second feature has a third feature like the above embodiment, in which the reflective surface 5 includes, as the diffusion groove arrays 50, at least the first diffusion groove array 501 and the second diffusion groove array 502. The second diffusion groove array 502 is between the first diffusion groove array 501 and the second end 102, and adjoins the first diffusion groove array 501 in the length direction d1 of the light guide member 1. A diffusion groove 7, nearest to the second end 102, of the diffusion grooves 7 in the first diffusion groove array 501 may be nearer to the second end 102 than a diffusion groove 7, nearest to the first end 101, of the diffusion grooves 7 in the second diffusion groove array 502.

In this case, the groove formation regions 8B include a common part of adjoining groove formation regions 8B, which is outside a region between the two inspection grooves 70B and which has diffusion grooves 7.

With the light guide member 1 having the third feature, even if the second diffusion groove array 502 is out of place from a design position owing to, for example manufacturing error or the like, the second diffusion groove array 502 can be easily formed in a position near to the first diffusion groove array 501. The light guide member 1 is therefore hard to be dark partially when light is exited therefrom. It is also possible to generally check an overlapping area of a region of the first diffusion groove array 501 and a region of the second diffusion groove array 502, by measuring the interval D2 between the inspection groove 70B, near to the second end 102, of the first diffusion groove array 501 and the inspection groove 70B, near to the first end 101, of the second diffusion groove array 502.

Preferably, the light guide member 1 having the third feature has a fourth feature like the above embodiment, in which the inspection groove 70B, near to the second end 102, of the two inspection grooves 70B in the first diffusion groove array 501 may be nearer to the first end 101 than a diffusion groove 7, nearest to the first end 101, of the diffusion grooves 7 in the second diffusion groove array 502. The inspection groove 70B, near to first end 101, of two inspection grooves 70B in the second diffusion groove array 502 may be nearer to the second end 102 than the diffusion groove 7, nearest to the second end 102, of the diffusion grooves 7 in the first diffusion groove array 501.

With the light guide member 1 having the fourth feature, the inspection groove 70B, near to the second end 102, in the first diffusion groove array 501 is not formed in a region of the reflective surface 5 formed with the second diffusion groove array 502. In addition, the inspection groove 70B, near to first end 101, in the second diffusion groove array 502 is not formed in a region of the reflective surface 5 formed with the first diffusion groove array 501. This enables an inspector to perform the visual inspection of the inspection groove 70B, near to the second end 102, in the first diffusion groove array 501 and the inspection groove 70B, near to first end 101, in the second diffusion groove array 502.

Preferably, the light guide member 1 having the third or fourth feature has a fifth feature like the above embodiment, in which the reflective surface 5 is formed with diffusion grooves 7 every diffusion groove array 50 in accordance with a corresponding prepared pattern that is set every diffusion groove array 50.

In this case, a prepared pattern is set every groove formation region 8B.

With the light guide member 1 having the fifth feature, the diffusion groove arrays 50 are formed based on respective prepared patterns for the diffusion groove arrays 50.

Preferably, the light guide member 1 having any of the third to fifth features has a sixth feature like the above embodiment, in which diffusion grooves 7 in each of the diffusion groove arrays 50 are arranged at equal intervals in the length direction d1 of the light guide member 1.

With the light guide member 1 having the sixth feature, an inspector can generally check whether or not diffusion grooves 7 arranged at equal intervals in each diffusion groove array 50 are correctly formed, by measuring the interval D1 between the two inspection grooves 70B in a corresponding diffusion groove array 50.

The light guide member manufacturing method in the embodiment is a manufacturing method for light guide members 1 elongated in one direction, and has a seventh feature below. The light guide member 1 includes: the first end 101 that is one end, in the length direction d1, of the light guide member 1; and the second end 102 that is an opposite end of the light guide member 1 from the first end 101. The light guide member 1 further includes a light entrance surface 4A or 4B that is provided on at least one of the first and second ends 101 and 102. The light guide member 1 further includes the reflective surface 5 and the light exit surface 6. The reflective surface 5 is provided along the length direction d1 of the light guide member 1, and configured to reflect light from the light entrance surface 4A or 4B. The light exit surface 6 is provided along the length direction d1 of the light guide member 1, and allows the light reflected in the reflective surface 5 to exit from. The reflective surface 5 include at least one diffusion groove array 50. The diffusion groove array 50 includes diffusion grooves 7 that are arranged in the reflective surface 5 in the length direction d1 of the light guide member 1. Each of the diffusion grooves 7 is configured to diffuse the light from the light entrance surface 4A or 4B. The diffusion groove array 50 includes, as the diffusion grooves 7, at least two inspection grooves 70B and a non-inspection diffusion groove 71. The two inspection grooves 70B are spaced in the length direction d1 of the light guide member 1. The non-inspection diffusion groove 71 is between the two inspection grooves 70B. The diffusion grooves 7 are formed by grooving work onto the reflective surface 5 of the light guide member 1. The two inspection grooves 70B are formed with respective intermediate parts, in the length direction, of the two inspection grooves 70B divided by respective ungrooved portions 700 to which grooving work is not applied.

With the light guide member manufacturing method having the seventh feature, light diffusion part (diffusion grooves 7) can be easily formed in the reflective surface 5 only by grooving work. It is accordingly possible to increase productivity of light guide members 1 in comparison with the case where such light diffusion part is formed by, for example printing because a mask for the printing is unnecessary. In addition, an inspector can generally check whether or not diffusion grooves 7 are correctly formed by, for example measuring the interval D1 between the two inspection grooves 70B. Each of the two inspection grooves 70B can be easily provided with an ungrooved portion 700 as a marker only by not applying grooving work to an intermediate part, in the length direction, of a corresponding inspection groove 70.

Preferably, the light guide member manufacturing method having the seventh feature has an eighth feature in which the grooving work includes laser radiation onto the reflective surface 5. Each ungrooved portion 700 may be provided by stopping or decreasing laser output while a corresponding inspection groove 70B is formed by the laser radiation.

In this case, multiple diffusion grooves 7 are formed by the laser radiation. Each ungrooved portion 700 is provided by stopping or decreasing the laser output while a corresponding inspection groove 70 is formed by the laser radiation.

With the light guide member manufacturing method having the eighth feature, each ungrooved portion 700 can be easily provided in a process in which each diffusion groove 7 is formed by the laser radiation.

Preferably, the light guide member manufacturing method having a seventh or eighth feature has a ninth feature in which the reflective surface 5 includes the groove formation regions 8 arranged in the length direction d1 of the light guide member 1. The reflective surface 5 includes, as at least one diffusion groove array 50, diffusion groove arrays 50 arranged in the length direction d1 of the light guide member 1. The groove formation regions 8 are formed one-to-one with the diffusion groove arrays 50 by applying respective grooving work to the groove formation regions 8 based on respective prepared patterns for the groove formation regions 8.

With the light guide member manufacturing method having the ninth feature, the diffusion groove arrays 50 can be formed based on the respective prepared patterns for the diffusion groove arrays 50.

Preferably, the light guide member manufacturing method having the ninth feature has a tenth feature in which the reflective surface 5 includes, as the diffusion groove arrays 50, the first diffusion groove array 501 and the second diffusion groove array 502. The second diffusion groove array 502 is between the first diffusion groove array 501 and the second end 102, and adjoins the first diffusion groove array 501 in the length direction d1 of the light guide member 1. The reflective surface 5 includes, as the groove formation regions 8, the first groove formation region 81 and the second groove formation region 82. The second groove formation region 82 is between the first groove formation region 81 and the second end 102, and adjoins the first groove formation region 81 in the length direction d1 of the light guide member 1. A part of the first groove formation region 81 and a part of the second groove formation region 82 constitute a common part. The first groove formation region 81 is formed with the first diffusion groove array 501. The second groove formation region 82 is formed with the second diffusion groove array 502, with a diffusion groove 7, nearest to the second end 102, of the diffusion grooves 7 in the first diffusion groove array 501 being nearer to the second end 102 than a diffusion groove 7, nearest to the first end 101, of the diffusion grooves 7 in the second diffusion groove array 502.

With the light guide member manufacturing method having the tenth feature, even if the second diffusion groove array 502 is out of place from a design position owing to, for example manufacturing error or the like, the second diffusion groove array 502 can be easily formed in a position near to the first diffusion groove array 501. The light guide member 1 is therefore hard to be dark partially when light is exited therefrom. It is also possible to generally check an overlapping area of a region of the first diffusion groove array 501 and a region of the second diffusion groove array 502, by measuring the interval D2 between the inspection groove 70B, near to the second end 102, of the first diffusion groove array 501 and the inspection groove 70B, near to the first end 101, of the second diffusion groove array 502.

Preferably, the light guide member manufacturing method having a ninth or tenth feature has an eleventh feature in which the diffusion groove arrays 50 are formed one-to-one in the groove formation regions 8 with the diffusion grooves 7 arranged at equal intervals in the length direction d1 of the light guide member 1.

With the light guide member manufacturing method having the eleventh feature, it is possible to manufacture light guide members 1, in each of which diffusion grooves 7 of each diffusion groove array 50 are arranged at equal intervals. An inspector can generally check whether or not diffusion grooves 7 of each diffusion groove array 50 are formed correctly, by measuring the interval D1 between the two inspection grooves 70B of a corresponding diffusion groove array 50.

Preferably, the light guide member manufacturing method having the seventh to eleventh features has a twelfth feature in which light guide members 1 are manufactured by extrusion molding process. The grooving work is applied to the light guide members 1 extruded continuously by the extrusion molding process.

With the light guide member manufacturing method having the twelfth feature, it is possible to efficiently form the diffusion groove array 50 with diffusion grooves 7 in the light guide member 1.

Although the present invention has been described with reference to certain preferred embodiments, numerous modifications and variations can be made by those skilled in the art without departing from the true spirit and scope of this invention, namely claims.

The invention claimed is:

1. A manufacturing method for a light guide member, the light guide member comprising:
   first and second ends, the first end being one end, in a length direction, of the light guide member elongated in one direction, the second end being an opposite end of the light guide member from the first end, a light entrance surface being provided on at least one of the first and second ends;
   a reflective surface that is provided along the length direction of the light guide member and configured to reflect light from the light entrance surface; and a light exit surface that is provided along the length direction of the light guide member and allows the light reflected in the reflective surface to exit from, wherein the reflective surface comprises at least one diffusion groove array including diffusion grooves that are arranged in the reflective surface in the length direction of the light guide member and configured to diffuse the light from the light entrance surface, the diffusion groove array comprising, as the diffusion grooves, at least two inspection grooves and a non-inspection diffusion groove, the two inspection grooves being spaced in the length direction of the light guide member, the non-inspection diffusion groove being between the two inspection grooves, and the manufacturing method for the light guide member comprising:
  forming the diffusion grooves by grooving work onto the reflective surface of the light guide member; and
  dividing an intermediate part, in a length direction, of each of the two inspection grooves by an ungrooved portion to which the grooving work is not applied, thereby forming the two inspection grooves;
  stopping or decreasing laser output while the two inspection grooves are formed by the laser radiation, thereby providing the ungrooved portions, wherein the grooving work includes laser radiation onto the reflective surface, the reflective surface comprises groove formation regions arranged in the length direction of the light guide member, and the reflective surface comprises, as said at least one diffusion groove array, diffusion groove arrays arranged in the length direction of the light guide member; and wherein the manufacturing method for the light guide member further comprises:
  applying the grooving work to the groove formation regions based on respective prepared patterns for the groove formation regions, thereby forming the diffusion groove arrays in the groove formation regions one by one.

2. The manufacturing method of claim 1, wherein
the reflective surface comprises, as the diffusion groove arrays, a first diffusion groove array and a second diffusion groove array, the second diffusion groove array being between the first diffusion groove array and the second end, and adjoining the first diffusion groove array in the length direction of the light guide member, the reflective surface comprises, as the groove formation regions, a first groove formation region and a second groove formation region, the second groove formation region being between the first groove formation region and the second end, and adjoining the first groove formation region in the length direction of the light guide member, a part of the first groove formation region and a part of the second groove formation region constitute a common part, the first groove formation region is formed with the first diffusion groove array, and the second groove formation region is formed with the second diffusion groove array, a diffusion groove, nearest to the second end, of the diffusion grooves in the first diffusion groove array being nearer to the second end than a diffusion groove, nearest to the first end, of the diffusion grooves in the second diffusion groove array.

3. The manufacturing method of claim 1, wherein the groove formation regions are formed one-to-one with the diffusion groove arrays, in each of which the diffusion grooves are arranged at equal intervals in the length direction of the light guide member.

4. The manufacturing method of claim 1, wherein
the light guide member is manufactured by an extrusion molding process, and
the grooving work is applied to the light guide member extruded continuously by the extrusion molding process.

* * * * *